United States Patent [19]

Reinert

[11] 4,223,100
[45] Sep. 16, 1980

[54] FLAME RETARDANT AROMATIC POLYCARBONATE WITH GOOD MECHANICAL PROPERTIES AND MELT STABILITY

[75] Inventor: Gerard E. Reinert, McMurray, Pa.

[73] Assignee: Mobay Chemical Corporation, Pittsburgh, Pa.

[21] Appl. No.: 31,089

[22] Filed: Apr. 18, 1979

Related U.S. Application Data

[63] Continuation-in-part of Ser. No. 53, Jan. 2, 1979, abandoned, which is a continuation-in-part of Ser. No. 934,787, Aug. 18, 1978, abandoned, which is a continuation of Ser. No. 759,606, Jan. 14, 1977, abandoned.

[51] Int. Cl.$^2$ .............................................. C08L 69/00
[52] U.S. Cl. ................................ 525/146; 260/45.7 R; 260/45.7 P; 260/45.75 R; 260/45.75 N; 260/45.75 B; 260/45.75 P; 260/45.75 F; 260/DIG. 24; 264/331
[58] Field of Search ................... 260/45.7 R, DIG. 24, 260/873; 525/146

[56] References Cited

U.S. PATENT DOCUMENTS

| 3,290,412 | 12/1966 | Goldblum | 525/146 |
|---|---|---|---|
| 3,647,747 | 3/1972 | Bialous | 260/45.75 R |
| 3,651,174 | 3/1972 | Bialous | 260/873 |
| 3,733,295 | 5/1973 | Martin et al. | 260/42.47 X |
| 3,742,085 | 6/1973 | Bialous | 525/146 |
| 3,775,367 | 11/1973 | Nouvertné | 260/45.9 R |
| 3,836,490 | 9/1974 | Bockmann et al. | 260/45.7 R X |
| 3,876,580 | 4/1975 | Nouvertne et al. | 260/37 PC |
| 3,909,489 | 9/1975 | Callander | 260/45.7 R |
| 4,110,299 | 8/1978 | Mark | 260/873 X |
| 4,113,695 | 9/1978 | Mark | 260/45.7 R X |

FOREIGN PATENT DOCUMENTS 2149311  4/1973  Fed. Rep. of Germany .
2535262  2/1976  Fed. Rep. of Germany .
2631756  2/1977  Fed. Rep. of Germany .
1370744 10/1974  United Kingdom .

Primary Examiner—Howard E. Schain
Attorney, Agent, or Firm—Gene Harsh; Lawrence S. Pope

[57] ABSTRACT

The present invention is concerned with flame retardant polycarbonate compositions having good mechanical properties and melt stability. These properties are achieved by adding small amounts of a fibril forming polytetrafluoroethylene, and an alkali metal salt of an inorganic acid, and a small amount of aromatically bound chlorine or bromine contained in a compound other than an organic alkali metal or alkaline earth metal salt to a thermoplastic aromatic polycarbonate.

16 Claims, No Drawings

FLAME RETARDANT AROMATIC POLYCARBONATE WITH GOOD MECHANICAL PROPERTIES AND MELT STABILITY

This application is a continuation-in-part of my copending application, Ser. No. 000,053, filed Jan. 2, 1979, which itself is a continuation-in-part of my copending application, Ser. No. 934,787, filed Aug. 18, 1978, which in turn is a continuation of Ser. No. 759,606, filed Jan. 14, 1977, all now abandoned.

BACKGROUND OF THE INVENTION

Since the issuance of U.S. Pat. No. 3,028,365 in Apr. of 1962, aromatic polycarbonate has become well known and accepted as a thermoplastic resin suitable for a wide variety of uses including injection molding, extrusion and film formation. The chemistry, synthesis, properties and applications of these polycarbonates are extensively discussed in *Chemistry and Physics of Polycarbonates* by Schnell, Interscience, 1964 and *Polycarbonates* by Christopher and Fox, Reinhold, 1962.

Although polycarbonates have some inherent flame resistance, being self-extinguishing, ever more demanding flame retardancy requirements have spawned numerous attempts to increase this property. Two general approaches have been followed.

One approach has been to add substantial amounts of halogen, particularly bromine or chlorine, to polycarbonate compositions. The halogen can be carried by polycarbonate polymer chains as in U.S. Pat. Nos. 3,751,400 and 3,334,154 or by a monomeric compound as in U.S. Pat. No. 3,382,207. However, the presence of substantial amounts of halogen has been found to be detrimental to the properties of the polycarbonate and numerous additives such as those proposed in U.S. Pat. Nos. 3,647,747 and 3,733,295 have been proposed to overcome these detrimental effects.

An alternative approach has been the addition of various organic and/or inorganic metal salts to impart the desired flame retardancy. U.S. Pat. No. 3,775,367 teaches the use of about 0.01 to 1 wt. % of perfluoroalkane sulfonic acid salts of alkali metals and suggests the presence of halogen either on the polymer backbone or by additive compound will enhance the flame retarding efficiency of these salts. U.S. Pat. No. 3,836,490 teaches the use of 0.00005 to 0.1 wt. % of selected organic alkali salts of carboxylic acids in halogen free or halogen bearing polycarbonates wherein the salts are soluble in the polycarbonate melt. In contrast, German Published Pat. No. 2,149,311 teaches the use of about 0.05 to 3.0 wt. % of insoluble alkali metal salts, particularly salts of inorganic acids, phosphonic acids and sulfonic acids. U.S. Pat. No. 3,535,300 teaches the use of small amounts of specified metal salts (which do not include alkali metal salts) in combination with about 0.01 to 1 wt. % of halogen carried on the polymer backbone or on an additive. The halogen is said to "synergistically" interact with the salt. U.S. Pat. No. 4,110,299 discloses the use of small amounts of additives selected from the group consisting of organic alkali metal salts and organic alkaline earth metal salts in combination with additives selected from the group consisting of an inorganic halide and an organic monomeric or polymeric aromatic or heterocyclic halide to improve the flame retardancy of an aromatic polycarbonate. The effect of the organic salt and the inorganic or organic halide is said to be a synergistic interaction.

In either the halogen or the salt approach, two aspects of flame retardancy must be considered. The UL subject 94 test which has come to be widely accepted for testing the flame resistance of organic polymers measures both a polymeric resistance to being consumed by a flame and a polymer's tendency to drip flaming particles when exposed to a flame. The later aspect, dripping, has been found to be the more difficult to control. U.S. Pat. No. 3,876,580 teaches the use of 2 to 6 wt. % of glass fibers in combination with either between 1 and 3 wt. % of halogen (chlorine or bromine) or between 0.01 and 1 wt. % of salts of nickel or alkali metals to achieve both properties of flame retardance. The patent notes that if the salt and halogen are both added, less of each is required to obtain the desired flame retardance. German Pat. (Offenlegungsschrift) No. 2,535,262 teaches adding fluorinated polyolefins such as polytetrafluoroethylene to a polycarbonate containing organic alkali metal salts to retard dripping. Finally, U.S. Pat. No. 4,110,299 suggests the addition of a fluorinated polyolefin, fibrous glass or a siloxane in combination with an organic salt/inorganic or organic halide mixture to diminish an aromatic polycarbonate's tendency to drip.

All of the above approaches have been tried and found to meet to some extent the three primary objectives of flame retardancy in thermoplastic resins:

(1) Increasing the polymers resistance to fire as measured both by composition and dripping;

(2) Minimizing the detrimental effects of the flame retardant, be it halogen bound to the polymer backbone or additives or both, on the other properties of the polymer, particularly mechanical properties and high temperature stability such as resistance to degradation during molding; and (3) Using the least expensive system which will meet the other two objectives.

Clearly these three objectives may be somewhat contradictory and a balance must be sought. For instance, a sufficient amount of some additives may achieve any desired degree of flame retardance, but at an unacceptable loss of other polymer properties.

The flame retardance of a polycarbonate may be increased by increasing either the amount or efficacy of the flame retardant system. The former approach is less attractive because as the level of either chemically incorporated halogen or additive is increased, the polymers other properties, particularly mechanical properties, are usually decreased.

The efficacy of a flame retardant system may be increased by lowering the melt flow rate (and therefore increasing the relative viscosity and molecular weight) of the polycarbonate. Lower melt flow resins generally have better mechanical properties and are able to tolerate higher additive levels. But more importantly, lower melt flow resins have an inherently greater resistance to dripping which, as discussed above, is one of the two aspects of flame retardancy.

Unfortunately, lowering the melt flow of the resin has disadvantages. As the melt flow is reduced, it becomes more difficult to process the polycarbonate into finished form, particularly by injection molding which is one of the most important end uses. In addition, the processing of lower melt flow polycarbonate usually requires the resin to be subjected to higher temperatures for longer periods of time thus heightening the possibility that the resin will suffer some degradation during processing.

Conversely the detrimental effects of a flame retardant system may be decreased by lowering its amount or by using a system of which the polycarbonate is more tolerant. The amount of flame retardant may be reduced by using a system which is more effective, e.g. substituting bromine for chlorine (as taught in Canadian Pat. No. 725,726). The less of a flame retardant that is present usually the more tolerant polycarbonate is of it although certain flame retardants such as combinations of iron salts and bromine have been found to cause particular problems of high temperature stability.

Naturally, the least expensive flame retardant system which achieves both the desired flame retardant properties and the desired mechanical properties is to be preferred. Usually, the more readily available or the more easily synthesized flame retardants are somewhat less expensive. For instance, the organic alkali metal carboxylates of U.S. Pat. No. 3,836,490 are less expensive and more readily available than the alkali metal perfluoro alkane sulfonates of U.S. Pat. No. 3,775,367.

However, increasingly more stringent requirements have made it ever more difficult to meet both criteria 1 and 2. Many of the prior art flame retardant systems are unable to achieve required flame retardance and still retain adequate mechanical properties. For instance, higher degrees of flame retardance, e.g. 94V-O in UL subject 94, are being required in thinner sections, e.g. 1.6 mm. As the section thickness is decreased, the difficulty of achieving the required flame retardance increases.

An objective of the present invention is to find a flame retardant system for an aromatic polycarbonate which meets the stringent requirements of both criteria 1 and 2 above without the use of a halogenated organic salt, specifically a halogenated organic alkali metal salt or a halogenated organic alkaline earth metal salt.

SUMMARY OF THE INVENTION

It has now been found that combinations of polytetrafluoroethylene (PTFE) and alkali metal salts of inorganic acids synergistically interact to impart high levels of flame retardancy to polycarbonates into which they are incorporated even when these additives are present in small amounts. It has also been found that the presence of small amounts of halogen particularly chlorine or bromine will synergistically increase the effectiveness of the PTFE salt combination. The polytetrafluoroethylene should be of the type which forms fibrils on being subjected to shear and should be present in an amount sufficient to reduce the polycarbonate's tendency to drip; preferably about 0.01 to 1 wt. % based on the weight of the composition. The alkali metal salt should be present in an amount sufficient to reduce the flame consumption of the polycarbonate, i.e. its ability to support combustion, and preferably in an amount between about 0.01 and 1 wt. % based on the weight of the composition. In the embodiment wherein chlorine or bromine is used, the halogen should be bound to an aromatically bonded carbon atom contained in a compound other than an organic alkali metal or alkaline earth metal salt and should be present in an amount sufficient to enhance the flame retardance of the polycarbonate, alkali metal salt, and PTFE composition. Preferably, the halogen is present at between about 0.05 and 3 wt. % based on the weight of the total composition.

DETAILED DESCRIPTION OF THE INVENTION

The polytetrafluoroethylene suitable for use in the present invention is well known and commercially available. It should have the characteristic that it forms fibrils when subjected to shear. Among the suitable polytetrafluoroethylenes are those described in U.S. Pat. Nos. 3,005,795 and 3,671,487 incorporated herein by reference and German Published Pat. No. 2,535,262. A particularly preferred form of PTFE is available from Du Pont as TEFLON ® Type 6 and is designated by the ASTM as Type 3.

The polytetrafluoroethylene may conveniently be used in amounts up to about 2 wt. % based on the weight of the total composition. However, it is preferred to use between about 0.01 and 1 wt. % and more preferred to use between about 0.05 and 0.2 wt. %.

The salts useful in the present invention include those formed between the alkali metal elements and inorganic acids. Lithium, sodium and potassium salts are preferred. Suitable inorganic acids include any compound which does not contain a carbon atom and meets the traditional tests of acidity. Among the suitable acids are the mineral acids and other Lewis acids which do not contain carbon atoms. Preferred acids are those that form salts with alkali metals which have pH values of about 7 or less.

The most preferred salts are the inorganic alkali metal complex fluoro anion salts, this terminology being derived from the discussion of fluorine compounds contained in the text *Advanced Inorganic Chemistry* by F. A. Cotton and G. Wilkinson, Interscience Publishers, 1962, at pages 290-294, these pages being incorporated herein by reference. Suitable inorganic alkali metal complex fluoro anion salts include $KBF_4$, $K_3AlF_6$, $KAlF_4$, $K_2SiF_6$, $Na_3AlF_6$, $KPF_6$, $NaSbF_6$, $Na_3FeF_6$, $NaPF_6$, $Na_2SiF_6$, $Na_2TiF_6$, $NaBF_4$, $K_2TaF_7$, $K_2NbF_7$, $KSbF_6$, $K_2NiF_6$, $K_2TiF_6$, $LiBF_4$, $LiPF_6$ and $LiBeF_4$.

$KBF_4$, $K_3AlF_6$, $KAlF_4$, $K_2SiF_6$ and $Na_3AlF_6$ are the preferred inorganic alkali metal complex fluoro anion salts, and $Na_3AlF_6$ is the most preferred inorganic alkali metal complex fluoro anion salt.

In general, polycarbonate is sensitive to both acidic and alkaline conditions, but is generally more tolerant of acidic conditions. Thus, it is preferred that the salts be neutral or acidic and especially preferred that they be neutral. This sensitivity may be reflected by the polycarbonate's hydrolysis resistance. Particularly under hot, humid conditions, additives which display alkaline behavior upon exposure to water tend to cause degradation of polycarbonate.

The salts may be used in any effective amount up to about 2 wt. % based on the total weight of the polycarbonate. It is preferred to use no less than about 0.01 wt. % and more preferably no less than about 0.1 wt. %. It is also preferred to use no more than about 1 wt. % and more preferably about 0.5 wt. %. Higher than 2 wt. % of salt will not decrease its effect upon flame retardance but may cause a greater degradation in other properties of the polycarbonate than is justified by the increase in flame retardancy achieved.

Naturally, any particular salt which is known to have characteristics likely to make it unacceptable for use in polycarbonate should be avoided. For instance, salts which decompose at the processing temperatures of the polycarbonate into which they are incorporated should be avoided.

The salts suitable for use in the present invention are substantially insoluble in polycarbonate. It is believed that such salts will have very limited mobility in the polycarbonate matrix at room temperature and therefore will have a reduced tendency to such problems as leaching out. These salts should also have a reduced tendency to concentrate at the surface or plate out upon molding.

The halogen carrier may be any monomeric or polymeric compound other than an organic alkali metal or alkaline earth metal salt which has chlorine or bromine atoms bound directly to aromatically bound carbon atoms. Compounds containing higher concentrations of chlorine or bromine are preferred because they supply the same halogen content at a lower additive level. It is believed that the chlorine or bromine atoms are the active portion of these additives as regards flame retardancy. Of the monomeric compounds, those which contain phenyl or diphenyl structures are preferred with those containing ester or carbonate bonds being particularly preferred. Of the polymeric compounds, polyesters or polycarbonates derived from aromatic monomers which are chlorine or bromine substituted are preferred with polycarbonate copolymers based upon halogen substituted and halogen free aromatic dihydroxy compounds such as 2,2-bis-(3,5-dichloro-4-hydroxyphenyl)-propane and 2,2-bis-(4-hydroxyphenyl)-propane being particularly preferred. Suitable polymers include the oligomers taught in U.S. Pat. No. 3,855,277 and the high molecular weight polymers of U.S. Pat. No. 3,334,154 and No. 3,751,400. Of course, the halogen may also be carried directly on the backbone of the polycarbonate comprising the bulk of the composition.

The chlorine or bromine may be present in an effective amount up to about 3 wt. %. It is preferred in this embodiment to use at least about 0.05 wt. % of halogen and it is also preferred to use no more than about 1.0 wt. %. It is especially preferred to limit the halogen content to between about 0.1 and 0.5 wt. %. Higher halogen contents are disfavored because as is discussed in U.S. Pat. No. 3,876,580, they tend to cause degradation of the resin. In the present invention, such higher amounts are not justified by the increase in flame retardance which they achieve.

The polycarbonates useful in the present invention are based upon aromatic dihydroxy monomers and are thermoplastic resins. They include those described in the U.S. patents discussed in the Background of the Invention hereinabove and their disclosures are incorporated herein by reference. Suitable polycarbonates also include branched polycarbonates such as those described in U.S. Pat. Nos. 3,799,953 and 3,897,392 as well as U.S. Pat. No. Re. 27,682. Preferred polycarbonates and those which can be prepared from di-(monohydroxyaryl)-alkanes and derivatives of carbonic acid such as phosgene or chloroformate esters. Particularly preferred polycarbonates are those which can be prepared from 4,4'-dihydroxy-diaryl methanes. The most preferred polycarbonates are those based on 2,2-bis-(4-hydroxyphenyl)-propane. The polycarbonates should be of a molecular weight such that they are thermoplastic solids at room temperature. Preferably the polycarbonate has a weight average molecular weight of between about 10,000 and 200,000 and more preferably has a melt flow of between about 1 and 24 grams per ten minutes (as measured by ASTM Standard D 1238, condition O).

The polycarbonate composition of the present invention may also contain other conventional resin additives such as pigments, dyes, UV stabilizers, thermal stabilizers, mold release agents and fillers. However, fillers or reinforcing agents, such as glass fibers, which tend to reduce some mechanical properties such as impact strength should be avoided unless their addition produces a desired improvement in other mechanical properties such as stiffness. In particular, the addition of glass fibers is unnecessary to achieve satisfactory flame retardance.

The compositions of the present invention may be formed by any method commonly known to the art. For instance, the various additives may be dry blended with polycarbonate pellets and the mixture extruded. Alternatively, the additives may be metered to a devolatilizing extruder as the polymer is being recovered from solution. Of course, those additives which are soluble in polycarbonate process solvents may be added to a solution of polycarbonate and those which are soluble in polycarbonate may be added to its melt. The only requirements are that the additives be thoroughly distributed and that the incorporated polytetrafluoroethylene be subjected to sufficient shear to form fibrils in the polycarbonate matrix.

The polytetrafluoroethylene may be subjected to shear prior to incorporation into the polycarbonate, and it is believed that such prefibrilation enhances the flame retardancy and makes this additive effective at lower levels. (On the other hand, the necessary shear may be provided by some final forming operations such as injection molding.)

Without limiting the breadth of the present invention, the applicants believe that the polytetrafluoroethylene functions in the present invention by forming a fine fibril network in the matrix such as is described in U.S. Pat. No. 3,005,795. Therefore, the applicants prefer any pretreatment or method of incorporation of the polytetrafluoroethylene which would tend to promote the formation of such a network.

EXAMPLES

Tables I, II and III contain Examples 1 to 35.

In Tables I, II and III, the results of flammability tests according to standards of Underwriters' Laboratories, item 94 (UL 94) are listed. Tables II and III also include the results of test according to IBM 6-0430-102.

In the UL 94 test, individual specimens of the dimension 120 mm × 12.7 mm × the indicated thickness are vertically clamped and exposed twice for 10 seconds each time to a blue gas flame of 20 mm height, the top of the gas burner is positioned about 10 mm from the lower end of a test specimen. The specimens are positioned 30.5 cm above a horizontal layer of absorbent surgical cotton. For classifying the material, 5 test pieces are tested.

The following criteria are decisive for classification:

"94V-2"
Average after-burning time: ≦25 seconds
Maximal acceptable after-burning time after any one flame application: 30 seconds
The material may drip off burning.
"94V-1"
After burning times correspond to those of "94V-2" but material may not drip off burning.
"94V-0"

| | |
|---|---|
| Average after-burning time | ≦5 seconds |
| Maximal acceptable after-burning time | 10 seconds |
| The material must not drip off burning. | |

In the IBM 6-0430-102 test, test specimens measuring 120 mm×10 mm×indicated thickness are suspended vertically and exposed to a 20 mm high Bunsen burner flame (without an air supply). The distance of the top of the Bunsen burner is 10 mm from the bottom of the test specimen. The length of time is determined for which a test specimen can be exposed to the flame as described above without continuing to burn for longer than 30 seconds after removal of the flame, and without burning particles dripping off of the specimen and igniting a wad of cotton wool placed under the specimen. A material is classed as a Class A material if after a 60 second flame application time, the material will extinguish without producing flame droplets within 30 seconds. Class B materials are those that extinguish within 30 seconds after a 5 second or more flame application time but cannot withstand a 60 second flame application time without exceeding the foregoing. Thus, for example, if a material extinguishes within 30 seconds for flame application times up to 45 seconds it is classified Class B/indicated thickness/45 sec.

In the examples, pellets of the polycarbonates described are dry mixed with the various amounts of flame proofing additive by so-called tumbling. Thereafter, the pellets are extruded at about 260° C., using a mixing screw, to give a ribbon that is then chopped to give granules. These granules are then converted into the required test specimens in an injection molding machine at about 300° C.

The melt flow values were determined in accordance with ASTM D 1238, Condition O.

The base polycarbonate resins into which the additives were incorporated were the condensation products of phosgene and 2,2-bis-(4-hydroxyphenyl)-propane.

The melt stability of the compositions of Examples 1–15 were determined at 300° C. The Instron stability test used measures the melt viscosity (poise×10$^{-4}$) of the polymer after 5, 35 and 65 minutes residence time in the Instron barrel at 300° C., and a shear rate of 72 seconds $^{-1}$ on the polymer. The amount of change in the measured viscosity between 5 and 65 minutes in this test is a good indication of the stability of the polymer being tested. If there is a large drop in the viscosity between 5 and 65 minutes, the polymer is considered unstable; however, if the difference in the viscosity between 5 and 65 minutes is small, the polymer is stable. All of the compositions were found to be stable.

TABLE I

UL 94 COMBUSTIBILITY TEST RESULTS AT 3.2 mm

| | COMPOSITION WT. % | | | MELT FLOW RATE | UL-94 |
|---|---|---|---|---|---|
| EXAMPLE | SALT | PTFE | HALOGEN SOURCE | (g/10 min) | RATING |
| 1 | NONE | NONE | NONE | 7.4 | 94V-2 |
| 2 | 0.25 K$_3$AlF$_6$/KAlF$_4$ | 0.1 T-6[3] | — | 6.3 | 94V-0 |
| 3 | 0.25 K$_3$AlF$_6$/KAlF$_4$ | 0.1 T-6 | 2.5 Ue 8072[1] | 5.8 | 94V-0 |
| 4 | 0.25 KPF$_6$ | 0.1 T-6 | — | 10.0 | 94V-0 |
| 5 | 0.25 KPF$_6$ | 0.1 T-6 | 2.5 Ue 8072 | 11.0 | 94V-0 |
| 6 | 0.25 Na$_2$S$_2$O$_5$ | 0.1 T-6 | — | 8.4 | 94V-0 |
| 7 | 0.25 Na$_2$S$_2$O$_5$ | 0.1 T-6 | 2.5 Ue 8072 | 7.9 | 94V-0 |
| 8 | 0.25 NaSbF$_6$ | 0.1 T-6 | — | 8.7 | 94V-0 |
| 9 | 0.25 NaSbF$_6$ | 0.1 T-6 | 2.5 Ue 8072 | 9.1 | 94V-0 |
| 10 | 0.25 Na$_2$B$_4$O$_7$ | 0.1 T-6 | — | 7.1 | 94V-1 |
| 11 | 0.25 Na$_2$B$_4$O$_7$ | 0.1 T-6 | 2.5 Ue 8072 | 6.9 | 94V-0 |
| 12 | 0.25 K$_3$AlF$_6$/KAlF$_4$ | 0.1 T-6 | 0.6 DB-TCBPA[2] | 14.0 | 94V-0 |
| 13 | 0.25 K$_2$SiF$_6$ | 0.1 T-6 | 2.5 Ue 8072 | 12.8 | 94V-0 |
| 14 | 0.25 K$_4$P$_2$O$_7$ | 0.1 T-6 | 2.5 Ue 8072 | 21.5 | 94V-0 |
| 15 | 0.25 Na$_3$AlF$_6$ | 0.1 6C[3] | 0.5 NMTCPI[4] | 9.7 | 94V-0 |

[1] Tetrachloro BPA/BPA copolymer (10 wt. % chlorine) having a relative viscosity in methylene chloride at 25° C. of 1.281 measured at 0.5g of resin in 100 ml of solvent.
[2] Bis 2,4-dichlorobenzoate of tetrachloro BPA (40 wt % chlorine) having the structure

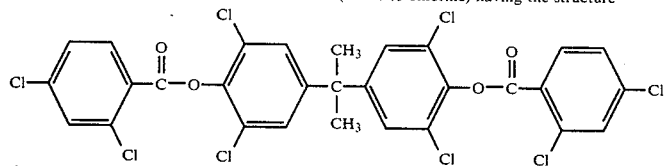

[3] Teflon T-6 and 6C (ASTM Type 3 polytetrafluoroethylene powder).
[4] N-methyltetrachlorophthalimide (47.4 wt. % chlorine) having the structure

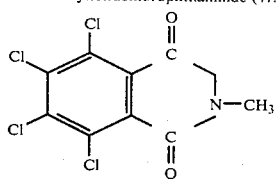

TABLE II

COMBUSTIBILITY TEST RESULTS ON COMPARISON COMPOSITIONS

| Example | Comparison Compositions | | | | | | | | | | | (According to Invention) | |
|---|---|---|---|---|---|---|---|---|---|---|---|---|---|
| | 16 | 17 | 18 | 19 | 20 | 21 | 22 | 23 | 24 | 25 | 26 | 27 | 28 |
| Composition wt. % | | | | | | | | | | | | | |
| KBF$_4$ | 0.25 | 0.50 | 1.00 | — | — | — | — | — | 0.25 | 0.25 | — | 0.25 | 0.25 |
| PTFE | — | — | — | 0.10 | 0.50 | 1.00 | — | — | 0.10 | — | 0.10 | 0.10 | 0.10 |
| TCPA* | — | — | — | — | — | — | 1.00 | 2.00 | — | 0.50 | 0.50 | 0.50 | 2.50** |
| Melt Flow Rate (g/10 min.) | 8.0 | — | — | — | — | — | — | — | 7.6 | — | 8.4 | 8.9 | — |
| UL-94 Rating | | | | | | | | | | | | | |
| 3.2 mm | 94V-2 | 94V-2 | 94V-2 | 94V-2 | 94V-0 | 94V-1 | 94V-2 | 94V-2 | 94V-1 | 94V-0 | 94V-2 | 94V-0 | 94V-0 |
| 2.3 mm | 94V-2 | Fails*** | Fails | Fails | Fails | Fails | Fails | Fails | 94V-0 | 94V-2 | Fails | 94V-0 | 94V-0 |
| 1.6 mm | 94V-2 | Fails | 94V-2 | 94V-2 | Fails | Fails | 94V-2 | Fails | 94V-2 | 94V-2 | Fails | 94V-0 | 94V-2 |
| IBM Test Rating/Ignition Time Seconds | | | | | | | | | | | | | |
| 3.2 mm | B-20 | B-15 | B-10 | B-15 | B-25 | B-30 | B-5 | B-10 | B-20 | B-20 | B-20 | B-35 | B-30 |
| 2.3 mm | B-10 | B-5 | B-5 | B-5 | B-10 | B-10 | B-5 | B-5 | B-10 | B-15 | B-5 | B-30 | B-20 |
| 1.6 mm | Fails**** | Fails | Fails | Fails | Fails | Fails | Fails | Fails | B-5 | B-10 | B-5 | B-20 | B-15 |

*Tetrachlorophthalic anhydride (52 wt. % chlorine).
**Tetrachloro BPA/BPA copolymer (10 wt. % chlorine) used in Table I (UE 8072)
***Fails 94V-2.
****Excessive burn time and/or dripping with the minimum 5 second ignition time.

TABLE III

COMBUSTIBILITY TEST RESULTS OF COMPOSITIONS ACCORDING TO THE INVENTION USING K$_2$SO$_4$ OR Na$_2$SO$_4$ AS THE INORGANIC ACID SALT

| | 29 | 30 | 31 | 32 | 33 | 34 | 35 |
|---|---|---|---|---|---|---|---|
| Composition wt. % | | | | | | | |
| K$_2$SO$_4$ | 0.25 | 0.75 | 0.75 | 0.25 | — | — | — |
| Na$_2$SO$_4$ | — | — | — | — | 0.25 | 0.75 | 0.25 |
| PTFE* | 0.50 | 0.10 | 0.10 | 0.10 | 0.10 | 0.10 | 0.10 |
| TCPA** | 0.50 | 0.50 | 1.00 | — | 1.00 | 1.00 | — |
| F-680*** | — | — | — | 0.50 | — | — | 0.50 |
| UL-94 Rating | | | | | | | |
| 3.2 mm | 94V-0 | 94V-0 | 94V-0 | 94V-0 | 94V-0 | 94V-0 | 94V-0 |
| 2.3 mm | 94V-0 | 94V-0 | 94V-0 | 94V-0 | 94V-0 | 94V-0 | 94V-0 |
| 1.6 mm | 94V-0 | 94V-0 | 94V-0 | 94V-1**** | 94V-0 | 94V-0 | 94V-0 |
| IBM Test Rating/Ignition Time Seconds | | | | | | | |
| 3.2 mm | A-60 | A-60 | A-60 | A-60 | A-60 | A-60 | A-60 |
| 2.3 mm | A-60 | A-60 | A-60 | A-60 | A-60 | A-60 | A-60 |
| 1.6 mm | A-60 | B-50 | A-60 | A-60 | A-60 | A-60 | A-60 |

*Teflon 6C
**Tetrachlorophthalic anhydride (52 wt. % chlorine)
***Firemaster 680 - brominated aromatic compound (70 wt. % bromine) from Velsicol Chemical Corporation
****Average burn time 5.6 sec. - maximum allowable for 94V-0 rating is 5.0 sec.

Particularly of interest in Table I are Examples 12–15. As discussed hereinabove, the melt flow of polycarbonate has a significant effect upon its flame retardant properties with higher melt flow resins generally having significantly poorer properties. Yet these four compositions with rather high melt flows are all able to achieve a UL-94 rating at 3.2 mm of 94V-O.

Tables II and III contain comparison data which clearly exhibit the synergistic flame-retardant properties of the novel aromatic polycarbonate/inorganic acid salt/fibril forming polytetrafluoroethylene/aromatically bound chlorine or bromine composition of the present invention as compared to prior art compositions.

As the data in Table II indicates, identical aromatic polycarbonate samples were individually blended with 0.25 weight %, 0.50 weight % and 1.00 weight % of potassium borotetrafluoride (Examples 16, 17 and 18, respectively); were individually blended with 0.10 weight %, 0.50 weight %, and 1.00 weight % of fibril forming polytetrafluoroethylene (Examples 19, 20 and 21, respectively); and were individually blended with 1.00 weight % and 2.00 weight % of tetrachlorophthalic anhydride (about 52%, by weight, chlorine), (Examples 22 and 23, respectively). However, none of these polycarbonate blends with the individual additives (or even any combination of two of the three additives—(Examples 24, 25 and 26) exhibited the superior flame retardant properties according to the UL-94 test or the IBM 6-0430-102 test that the Example 27 composition according to the present invention containing 0.25 weight % of potassium borotetrafluoride, 0.10 weight % of fibril forming polytetrafluoroethylene and 0.50 weight % of tetrachlorophthalic anhydride exhibited. It is noted that the Example 27 composition according to the present invention contained the lowest amount of each additive tested alone, but exhibited flame resistances significantly better than those of the polycarbonate compositions containing each additive alone, even when each additive was contained in quantities up to 10 times of that contained in the Example 27 composition according to the present invention.

Table III contains data which clearly indicates that these improved flame retardant properties are also exhibited by compositions according to the invention in which the inorganic acid salt is a "common" salt such as $K_2SO_4$ or $Na_2SO_4$.

Therefore, the compositions of the present invention represent a technological advance in meeting the three criteria commonly required of flame retardant systems. They provide high levels of flame retardance at low levels of additives (in some cases less than 1 or even 0.5 wt. %) while retaining good thermal stability and good mechanical properties, through the use of inexpensive additives. In particular the compositions of the present invention can provide polycarbonates having a UL-94 rating of at least 94V-O at 3.2 mm, or preferably 94V-O at 1.6 mm, while maintaining melt stability at 300° C. and good mechanical properties.

Although the invention has been described in detail in the foregoing for the purpose of illustration, it is to be understood that such detail is solely for that purpose and that variations can be made without departing from the spirit and scope of the invention except as it may be limited by the claims.

What is claimed is:

1. A thermoplastic aromatic polycarbonate composition consisting essentially of:
   (a) a thermoplastic aromatic polycarbonate having a melt flow of between 1 and 24 grams per ten minutes,
   (b) between about 0.01 and 1 wt. %, based on the weight of the total composition, of an alkali metal salt of an inorganic acid,
   (c) between about 0.01 and 1 wt. %, based on the weight of the total composition, of a fibril forming polytetrafluoroethylene, and
   (d) between 0.05 and 1.0 wt. %, based on the weight of the total comparison, of aromatically bound chlorine or bromine contained in a compound other than an organic alkali metal or alkaline earth metal salt.

2. The polycarbonate composition of claim 1 having a UL item 94 rating of 94V-O at 1.6 mm and having thermal stability at 300° C.

3. The polycarbonate composition of claim 1 consisting essentially of:
   (a) between about 0.1 and 0.5 wt. % of alkali metal inorganic acid salt,
   (b) between about 0.05 and 0.2 wt. % fibril forming polytetrafluoroethylene, and
   (c) between about 0.1 and 0.5 wt. % of aromatically bound chlorine or bromine contained in a compound other than an organic alkali metal or alkaline earth metal salt
wherein the weight percents are based on the total composition.

4. The polycarbonate composition of claim 1 containing between about 0.1 and 0.5 wt. % of aromatically bound chlorine or bromine contained in a compound other than an organic alkali metal or alkaline earth metal salt.

5. The polycarbonate composition of claim 1 wherein the alkali metal inorganic acid salts are salts of K, Li or Na.

6. An unreinforced molding composition having a UL item 94 rating of 94V-O at 1.6 mm, thermal stability at 300° C. and good mechanical properties consisting essentially of:
   (a) an aromatic thermoplastic polycarbonate which has a melt flow of between about 1 and 24 grams per 10 minutes and which is derived from 4,4'-dihydroxy diaryl methanes,
   (b) between about 0.1 and 0.5 wt. % of a Li, K, or Na salt of an inorganic acid,
   (b) between about 0.05 and 0.2 wt. % of fibril forming polytetrafluoroethylene, and
   (d) between about 0.1 and 0.5 wt. % of aromatically bound chlorine or bromine contained in a compound other than an organic alkali metal or alkaline earth metal salt
wherein the weight percents are based on the total composition.

7. A thermoplastic aromatic polycarbonate composition consisting essentially of:
   (a) between about 0.01 and 1 wt. %, based on the weight of the total composition, of an inorganic alkali metal complex fluoro anion salt,
   (b) between about 0.01 and 1 wt. %, based on the weight of the total composition, of a fibril forming polytetrafluoroethylene, and
   (c) between 0.05 and 1.0 wt. %, based on the weight of the total composition, of aromatically bound chlorine or bromine.

8. The polycarbonate composition of claim 7 having a UL item 94 rating of 94V-O at 1.6 mm and having thermal stability at 300° C.

9. The polycarbonate composition of claim 7 consisting essentially of:
   (a) between about 0.1 and 0.5 wt. % of the inorganic alkali metal complex fluoro anion salt.
   (b) between about 0.05 and 0.2 wt. % of fibril forming polytetrafluoroethylene, and
   (c) between about 0.1 and 0.5 wt. % of aromatically bound chlorine or bromine,
wherein the weight percents are based on the total composition.

10. The polycarbonate composition of claim 7 containing between about 0.1 and 0.5 wt. % of aromatically bound chlorine or bromine.

11. The polycarbonate composition of claim 7 wherein the inorganic alkali metal complex fluoro anion salt has a pH of about 7 or less.

12. The polycarbonate composition of claim 11 wherein the inorganic alkali metal complex fluoro anion salt is neutral.

13. The polycarbonate composition of claim 7 wherein the inorganic alkali metal complex fluoro anion salt is selected from the group consisting of $KBF_4$, $K_3AlF_6$, $KAlF_4$, $K_2SiF_6$, $Na_3AlF_6$, $KPF_6$, $NaSbF_6$, $Na_3FeF_6$, $NaPF_6$, $Na_2SiF_6$, $Na_2TiF_6$, $NaBF_4$, $K_2TaF_7$, $K_2NbF_7$, $KSbF_6$, $K_2NiF_6$, $K_2TiF_6$, $LiBF_4$, $LiPF_6$ and $LiBeF_4$.

14. The polycarbonate composition of claim 13 wherein the inorganic alkali metal complex fluoro anion salt is selected from the group consisting of $KBF_4$, $K_3AlF_6$, $KAlF_4$, $K_2SiF_6$ and $Na_3AlF_6$.

15. The polycarbonate composition of claim 14 wherein the inorganic alkali metal complex fluoro anion salt is $Na_3AlF_6$.

16. An unreinforced molding composition having a UL item 94 rating of 94V-O at 1.6 mm, thermal stability at 300° C. and good mechanical properties consisting essentially of:
   (a) an aromatic thermoplastic polycarbonate which has a melt flow of between ab ut 1 and 24 grams per 10 minutes and which is derived from 4,4'-dihydroxy diaryl methanes, (b) between about 0.1 and 0.5 weight % of an inorganic alkali metal complex fluoro anion salt, (c) between about 0.05 and 0.2 weight % of fibril forming polytetrafluoroethylene, and (d) between about 0.1 and 0.5 weight % of aromatically bound chlorine or bromine, wherein the weight percents are based on the total composition.

* * * * *